3,729,352
DOPED AMMONIUM PERCHLORATE OXIDIZERS AND METHOD OF PREPARING SAME
John Norman Maycock and Louis Witten, Baltimore, Md., assignors to Martin Marietta Corporation, New York, N.Y.
No Drawing. Filed Jan. 5, 1968, Ser. No. 695,865
Int. Cl. C06b 13/00
U.S. Cl. 149—74      8 Claims

ABSTRACT OF THE DISCLOSURE

An improved class of oxidizers is formed by precipitating crystals from an acid solution in which ammonium perchlorate has been dissolved and from an acid solution in which ammonium perchlorate and a quantity of nitronium perchlorate have been dissolved.

---

One important use of oxidizers is supplying oxygen to fuels in solid propellant compositions and ammonium perchlorate (AP) is a commonly used propellant oxidizer.

An increase in the burning rate of ammonium perchlorate accelerates the release of oxygen to the fuel. Numerous methods for enhancing ammonium perchlorate burning rate have been developed. In some of these, additives are mixed with the AP on a macroscopic level.

However, it is usually important that oxidizers burn uniformly, and one disadvantage of additives that have been mechanically mixed into oxidizers in the prior art has been that the inhomogeneity of the mixture often resulted in uneven burning. Also, solid bi-propellants are often made by mixing an oxidizer with a fuel and a binder, and mechanically mixed accelerators are sometimes not compatible with the binder material.

More recently, varieties of AP with accelerated burning rates have been developed that avoid both of the above enumerated problems by incorporating particular accelerating additives into the AP crystal structure. This invention provides improved AP oxidizers of the latter type, where the oxidizer crystals comprise AP "doped" with additives.

It is an object of this invention to provide an AP base oxidizer that burns faster than pure AP.

Another object of this invention is to provide an AP base oxidizer in which one or more additives are incorporated into the crystal structure, the homogeneous distribution thus effected providing very uniform burning and preventing undesirable reactions with binder materials.

A further object of this invention is to provide an AP base oxidizer with an accelerated burning rate that may be easily produced.

In one embodiment of this invention, an improved oxidizer is produced by dissolving AP ($NH_4ClO_4$) and a small quantity of nitronium perchlorate ($NO_2ClO_4$) in a heated nitric acid solvent and filtering off the crystalline precipitate which forms when the solution is allowed to cool. The resulting material comprises an AP base in which some of the ions from the nitronium perchlorate (NP) and nitric acid have been incorporated into the crystal structure. It is believed that some of the ammonium ions ($NH_4^+$) have been replaced in the crystal lattice with nitronium ions ($NO_2^+$) from the NP, that other ammonium ions have been replaced with $H^+$ ions from the nitric acid, and that some of the perchlorate ions ($ClO_4^-$) have been replaced in the lattice with $NO_3^-$ ions from the nitric acid. The crystals thus produced burn much more rapidly than do pure AP crystals and also exhibit greater sensitivity to shock than either AP or NP. It is believed that the "foreign" ions incorporated into the crystal structure effect the increase.

In another embodiment of the invention, AP is dissolved in nitric acid solutions of varying strengths. Crystals precipitated from these solutions are found to burn more rapidly than pure AP crystals. Even precipitates from very weak nitric acid solutions exhibit accelerated thermal decomposition compared to pure AP, although the increase becomes less pronounced as the strength of the nitric acid solution goes below about 20%. This is a gradual effect, however; there is no sharp break point at the 20% solution level, nor is there any critical lower level in solution percentage below which the effect is not apparent. In the crystals precipitated from solution in this embodiment, ions from the nitric acid are incorporated in the crystal structure. It is believed that some of the ammonium ions are replaced in the lattice by $H^+$ ions and that some of the perchlorate ions are replaced by $NO_3^-$ ions.

In still another inventive embodiment, AP is dissolved in hydrochloric acid solutions of varying strengths. Crystals precipitated from these solutions are found to burn significantly more rapidly than pure AP, although the increase is not as great as obtained from the two previous embodiments. Here again, ions from the acid solvent are incorporated into the crystal structure and it is believed that some ammonium and some perchlorate ions are replaced in the crystal lattice by $H^+$ and $Cl^-$ ions respectively.

In order that those skilled in the art may practice the invention, the examples below set forth the details of the methods whereby oxidizers of this invention are prepared.

EXAMPLE I

Ammonium perchlorate (AP) doped with nitronium perchlorate (NP) at $10^{-2}$ mole percent was prepared by placing 100 grams of analytical grade AP and 12.5 milligrams of analytical grade NP in 100% fuming nitric acid. The solution was then heated to a temperature slightly below 80° C. and stirred until the AP and NP were completely dissolved. The solution was then allowed to cool to room temperature and the crystals that precipitated were filtered off and dried under vacuum for four days. The dried crystals were then ground to a uniform particle size with an agate mortar and pestle. Strand burning tests were then conducted with the ground crystals thus obtained. Twelve 2-inch lengths of commercial straws having a 4 mm. inside diameter were packed with the ground crystals, and four packed straws were burned at each of three pressure ambients: 500 p.s.i.a., 1000 p.s.i.a. and 1500 p.s.i.a. The average burning rates for the four samples at each pressure are given in Table I.

They provide a comparison; pure AP was burned. Ten straws, identical to those used for the AP-NP material, were packed with analytical grade AP of substantially the same particle size as that of the AP-NP material and burned at 1000 p.s.i.a. The average burning rate of the ten AP samples is given in Table I. Also given in Table I are burning rates for pure AP at 500 p.s.i.a. and 1500 p.s.i.a. ambients, calculated from the experimentally obtained 1000 p.s.i.a value by a curve found applicable in pervious tests on AP burning rates, as indicated in the footnote beneath the table.

TABLE I

| | Burning rate, inches/sec. | |
|---|---|---|
| Pressure, p.s.i.a. | NP and $HNO_3$ doped AP | AP |
| 500 | 10.74 | [1] 8.74 |
| 1,000 | 16.18 | 13.70 |
| 1,500 | 22.16 | [1] 17.85 |

[1] Calculated, using the measured rate at 1,000 p.s.i.a. and assuming a straight line log-log plot of burning rate vs. pressure with a slope of 0.65 as has been found applicable in prior testing of AP burning rates.

The results given in Table I indicate that AP doped with NP and precipitated out of a 100% nitric acid solution burns at a significantly greater rate than pure AP at each of the three pressures.

The shock sensitivity of AP doped with NP in accordance with the method described in this example was obtained using a falling ball (modified JPL) type apparatus. The maximum energy that could be imparted by impact for ten successive trials without visible reaction or decomposition was 41.4 inch-lbs. When compared with shock sensitivity figures of greater than 100 inch-lbs. for AP and about 75 inch-lbs. for NP, it is apparent that the AP–NP material is much more sensitive to shock than either pure AP or pure NP.

EXAMPLE II

Analytical grade AP was dissolved in a 100% fuming nitric acid solution and precipitate crystals were obtained and prepared in accordance with the procedure described in Example I. The resulting ground crystals were packed in straws and burned in a manner identical to that described in Example I. The same number of samples were used at each pressure ambient and the burning rate data comprising the average of the four samples burned at each pressure is set forth in Table II, compared with similar burning rate data for pure AP.

TABLE II

| Pressure, p.s.i.a. | Burning rate, inches/sec. | |
|---|---|---|
| | $HNO_3$ doped AP | AP |
| 500 | 11.45 | [1] 8.74 |
| 1,000 | 16.61 | 13.70 |
| 1,500 | 21.12 | [1] 17.85 |

[1] Calculated, using the measured rate at 1,000 p.s.i.a. and assuming a straight line log-log plot of burning rate vs. pressure with a slope of 0.65 as has been found applicable in prior testing of AP burning rates.

It will be seen from Table II that the crystalline precipitate obtained from dissolving AP in 100% nitric acid burns at a significantly more rapid rate than does pure AP.

EXAMPLE III

Analytical grade AP was dissolved in different percentage solutions of nitric acid and precipitate crystals obtained and prepared in accordance with the procedure described in Example II. Also, for comparison, crystals were precipitated from AP dissolved in water with no nitric acid. For the latter, and for the various solutions containing less than 100% nitric acid, double distilled, de-ionized water was used. The thermal decomposition of the ground crystals so obtained was measured by means of thermogravimetric (TGA) analysis of samples of fifteen grams each in a dry helium atmosphere with a heating rate of 6° C. per minute. The results are given in Table III.

TABLE III.—PERCENTAGE WEIGHT LOSS MEASURED BY TGA

| Percent $HNO_3$ | Temperature (° C.) | | |
|---|---|---|---|
| | 290 | 330 | 390 |
| 0 | 1.5 | 12.5 | 48 |
| 5 | 15 | 29.5 | 53 |
| 10 | 18.5 | 30 | 61.5 |
| 15 | 21 | 30.5 | 78.5 |
| 20 | 22.5 | 29.5 | 85.5 |
| 25 | 22.5 | 30 | 79.5 |
| 50 | 23.5 | 30.5 | 79 |
| 75 | 21 | 30.5 | 75 |
| 100 | 23 | 31.5 | 64.5 |

The results shown in Table III indicate that the crystals obtained by dissolving AP even in very weak solutions of nitric acid have a significantly higher rate of thermal decomposition than does pure AP precipitated from water. These results are completely consistent with the burning rate data of Table II, as indicated by the results of the zero and 100% $HNO_3$ data.

EXAMPLE IV

Analytical grade AP was dissolved in different percentage solutions of hydrochloric acid and precipitate crystals obtained and prepared in accordance with the procedure described in Example III. The thermal decomposition of the ground crystals so obtained was measured by TGA in a procedure identical to that followed in Example III. The results are given in Table IV.

TABLE IV.—PERCENTAGE WEIGHT LOSS MEASURED BY TGA

| Percent HCl | Temperature (° C.) | | |
|---|---|---|---|
| | 290 | 330 | 390 |
| 20 | 2.5 | 12.5 | 66 |
| 50 | 2.5 | 12.5 | 66 |

A comparison of the data in Table IV with data in Table III indicates that crystals precipitated from solutions of hydrochloric acid do not thermally decompose as rapidly as crystals precipitated from solutions of the same percentage of nitric acid, although they decompose significantly faster than AP crystals precipitated from water.

Various modifications of the above illustrative embodiments as will occur to those skilled in the art are within the scope of the invention, which is defined solely by the appended claims.

What is claimed is:

1. A method for producing an oxidizer having an enhanced rate of thermal decomposition comprising dissolving ammonium perchlorate in an acid solution containing up to 100% of an inorganic acid and subsequently precipitating crystals therefrom.

2. A method for producing an oxidizer having an enhanced rate of thermal decomposition comprising dissolving ammonium perchlorate in an acid solution containing up to 100% nitric acid and subsequently precipitating crystals therefrom.

3. A method for producing an oxidizer having an enhanced rate of thermal decomposition comprising dissolving ammonium perchlorate and nitronium perchlorate in an acid solution and subsequently precipitating crystals therefrom.

4. A method for producing an oxidizer having an enhanced rate of thermal decomposition comprising dissolving ammonium perchlorate and nitronium perchlorate in an acid solution containing up to 100% nitric acid and subsequently precipitating crystals therefrom.

5. A method for producing an oxidizer having an enhanced rate of thermal decomposition comprising dissolving ammonium perchlorate in an acid solution containing up to 100% hydrochloric acid and subsequently precipitating crystals therefrom.

6. An improved oxidizer comprising ammonium perchlorate in which $H^+$ and $NO_3^-$ ions have been incorporated into the crystal lattice.

7. An improved oxidizer comprising ammonium perchlorate in which $H^+$, $NO_2^+$ and $NO_3^-$ ions have been incorporated into the crystal lattice.

8. An improved oxidizer comprising ammonium perchlorate in which $H^+$ and $Cl^-$ ions have been incorporated into the crystal lattice.

(References on following page)

References Cited

UNITED STATES PATENTS

| | | | |
|---|---|---|---|
| 2,763,619 | 9/1956 | Pino | 149—74 |
| 3,110,558 | 11/1963 | Markowitz | 23—85 |
| 3,147,160 | 9/1964 | McCrone | 149—76 |
| 3,172,793 | 3/1965 | Markowitz | 149—76 |
| 3,224,833 | 12/1965 | Robinson | 149—74 |
| 3,259,531 | 7/1966 | Lofberg | 149—76 |
| 3,269,879 | 8/1966 | Stammler et al. | 149—76 |
| 3,373,063 | 3/1968 | Bieber et al. | 149—74 |
| 3,383,180 | 5/1968 | Kralik et al. | 23—301 |

BENJAMIN R. PADGETT, Primary Examiner

S. J. LECHERT, Jr., Assistant Examiner

U.S. Cl. X.R.

23—85, 295; 149—76; 252—186